United States Patent [19]

Reid

[11] Patent Number: 5,060,913
[45] Date of Patent: Oct. 29, 1991

[54] INTEGRATED METALLURGICAL REACTOR

[75] Inventor: Kenneth J. Reid, Edina, Minn.

[73] Assignee: Regents of the University of Minnesota, Minneapolis, Minn.

[21] Appl. No.: 400,566

[22] Filed: Aug. 30, 1989

[51] Int. Cl.$^5$ ............................................. C21C 5/00
[52] U.S. Cl. .................................... 266/162; 266/175; 266/182; 266/186; 266/193; 266/195; 266/230
[58] Field of Search ............... 266/160, 162, 171, 175, 266/176, 182, 186, 190, 193, 230, 241; 75/500, 501, 502

[56] References Cited

U.S. PATENT DOCUMENTS

| 2,557,651 | 6/1951 | Gilliland | 266/24 |
| 3,463,472 | 8/1969 | Worner | 266/11 |
| 3,652,070 | 3/1972 | Sagara | 266/193 |
| 3,932,173 | 1/1976 | Collin et al. | 75/501 |
| 4,701,217 | 10/1987 | Warner | 75/92 |

FOREIGN PATENT DOCUMENTS

| 0266975 | 5/1988 | European Pat. Off. . | |
| 668242 | 10/1929 | France . | |
| 1067048 | 1/1984 | U.S.S.R. | 266/193 |
| 1046675 | 10/1966 | United Kingdom . | |

OTHER PUBLICATIONS

"Coal-Based Ironmaking", by R. B. Smith and M. J. Corbett, *Ironmaking and Steelmaking*, 1987, vol. 14, No. 2, pp. 49-75.

"Energy Considerations in Reduction Processes for Iron- and Steelmaking", by Sven Eketorp and Voicu Brabie, *Scandinavian Journal of Metallurgy*, 3 (1974), pp.200-204.

"Direct Smelting of Iron Ore in a Liquid Iron Bath-The Hismelt Process", by J. A. Innes et al., *1988 Process Technology Conference Proceedings*, pp. 225-231.

"Continuous Steelmaking Process: Research and Future", by Akira Fukuzawa, *Transactions of National Research Institute for Metals*, vol. 27, No. 2 (1985), pp. 1-9.

"Kinetics and Mechanism of the Reduction of Solid Iron Oxides in Iron-Carbon Melts from 1200° to 1500°", by Donald R. MacRae, *Journal of Metals*, Dec. 1965, pp. 1391-1395.

*Primary Examiner*—Melvyn J. Andrews
*Attorney, Agent, or Firm*—Kinney & Lange

[57] ABSTRACT

A smelting reduction process is carried out in a smelting reactor which includes a central internal carburization/combustion plenum or chamber in which hot metal is carburized by the injection of coal fines and heated by post combustion of the coal gases. The chamber has outlets to the first zone of an outer coaxial annular channel where the coal slag is separated off and a carburized hot metal passes into a second zone or smelting channel-chamber that permits introduction of feed material into a molten metal. A majority of the material that passes through the smelting channel-chamber is recycled to the internal carburization/combustion chamber for further processing. The internal carburization/combustion chamber and the smelting channel are completely separate so that the slag and the off gases from the two processes can be kept separate as well. The channel is positioned around the circumference of the internal carburization/combustion chamber where active heating occurs to form a compact reactor.

25 Claims, 6 Drawing Sheets

INTEGRATED METALLURGICAL REACTOR

BACKGROUND OF THE INVENTION

1. Field of the Invention

The present invention relates to an integrated metallurgical reactor for smelting oxides of metal, such as iron oxide, that is a compact reactor housing formed to have separate chambers to separate the key processes necessary for the manufacture of a variety of steels and irons from a variety of iron-bearing feedstocks, and having means for separate slag removal in each of the process regions to permit optimum performance and adjustment of the process in each stage.

2. Description of the Prior Art

In recent years there has been a significant increase in research aimed at developing new direct smelting processes particularly those using coal as the reductant. There are many motives for this effort most of which relate to the two broad categories of economic benefit and environmental concern.

A recent survey entitled "Coal Based Ironmaking" by Smith and Corbett (Ironmaking and Steelmaking, 14 (2), 1987), outlines a range of technologies and illustrates three basic flow sheet types covering single stage, two stage and three stage processes. In the single state configuration, ore, coal and oxygen are introduced into a single processing vessel, and the products are metal, slag and off gases. In the two stage configuration, ore and smelter off gases are introduced into a reduction unit and the reduced ore proceeds to the second stage (melting unit) where melting energy is provided by coal and oxygen. The separate use of smelter off gas reduces the overall energy requirement compared to single stage operation. The three stage configuration provides for separate reduction, gasification and melting, and potentially has the lowest energy requirement by converting excess heat in the melted off gas into chemical energy by the oxidation of carbon by $CO_2$ and/or $H_2O$. Unfortunately, these theoretical benefits are not always realized since several direct smelting processes based on the three stage principle require the use of coke which has serious energy inefficiencies associated with its production. The three stage process is inherently the most efficient and encompasses reduction, gasification and melting. Smith and Corbett illustrate four conceptual flow sheets for the three stage process concept.

An alternative way of considering process efficiency is to examine the use of the carbon in the reductant as it is employed to remove oxygen from the various oxidation levels of iron oxide species. The two major natural iron ore minerals are hematite ($Fe_2O_3$) and magnetite ($Fe_3O_4$) while the stable intermediate phase, wustite (FeO) does not occur naturally but plays a major role in the reduction sequence from iron ore to metal. The importance of wustite is illustrated by the relative energy requirements in the three step reduction sequence hematite→magnetite wustite→metal. At 800° C., the relative heats of reaction are 1 for hematite to magnetite, 3 for magnetite to wustite ($Fe_{0.947}O$) and 7.5 for wustite to iron.

The reduction can be considered in three steps. The least efficient, from a carbon utilization point of view, is that in which all oxygen is removed by elemental carbon to produce carbon monoxide. The reaction with elemental carbon generally takes place at high temperatures as in the lower regions of the blast furnace. At lower temperatures it is possible to reduce iron oxides with gases rich in carbon monoxide and two cases can be considered. In one case the natural oxides are reduced to wustite by gaseous carbon monoxide generated in a subsequent reduction step using elemental carbon and the final gaseous product is a mixture of carbon monoxide and carbon dioxide.

In the other case the excess carbon monoxide is used to reduce wustite to metallic iron and the final gaseous product is carbon dioxide. These three steps are represented by equations 1, 2 and 3 for hematite and by equations 4, 5 and 6 for magnetite.

$$Fe_2O_3 + 3\,C \rightarrow 2\,Fe + 3\,CO \qquad (Eq.\ 1)$$

$$Fe_2O_3 + 2\,C \rightarrow 2\,Fe + CO_2 + CO \qquad (Eq.\ 2)$$

$$2\,Fe_2O_3 + 3\,C \rightarrow 4\,Fe + 3\,CO_2 \qquad (Eq.\ 3)$$

$$Fe_3O_4 + 4\,C \rightarrow 3\,Fe + 4\,CO \qquad (Eq.\ 4)$$

$$Fe_3O_4 + 3\,C \rightarrow 3\,Fe + CO_2 + 2\,CO \qquad (Eq.\ 5)$$

$$Fe_3O_4 + 2\,C \rightarrow 3\,Fe + 2\,CO_2 \qquad (Eq\ 6)$$

The mass ratio of required carbon to iron produced, and the mass ratio of generated carbon monoxide to iron produced, are as follows.

| Eqn. No. | C/Fe | CO/Fe |
|---|---|---|
| 1 | .320 | .750 |
| 2 | .214 | .25 |
| 3 | .161 | 0 |
| 4 | .286 | .667 |
| 5 | .214 | .333 |
| 6 | .143 | 0 |

The minimum theoretical carbon requirement is for reduction involving one mole of magnetite with two moles of carbon. The carbon requirements for each reaction ($C_1$) relative to this minimum ($C_6$) are as follows.

| Eqn. No. = i | $C_i/C_6$ |
|---|---|
| 1 | 2.238 |
| 2 | 1.497 |
| 3 | 1.126 |
| 4 | 2.000 |
| 5 | 1.497 |
| 6 | 1.000 |

The carbon requirement for total reduction of magnetite by carbon (Eqn. 4) is 100% greater than that required for the optimal reduction of magnetite (Eqn. 6. Since the carbon requirement is provided by coal it can be seen that the cost for coal to carry out the various reduction sequences represented by equations 1 through 6 above varies over a range of two to one. There is consequently a considerable economic incentive to seek processes that will utilize the reaction sequences that minimize carbon requirements.

Eketorp and Brabie (Scand J. Met 3, 1974) have pointed out that in high temperature reduction smelting systems the reduction of iron oxides by carbon generates only CO and that energy recovery from the product gas is an important component in smelting reactor design considerations. As shown by Smith and Corbett (Ironmaking and Steelmaking, 14 (2), 1987) there are two fundamental approaches to this energy recovery concept; one seeks to maximize heat recovery to the melt by post reduction combustion while the other seeks to effectively use the carbon monoxide component in the off gas mixture for pre-reduction of the iron oxide feed.

Two recent approaches to direct smelting processes seek to maximize the energy recovery by high post reduction combustion and heat transfer. In one approach as disclosed by Warner in U.S. Pat. No. 4,701,217, 1987, two large furnaces of a geometric configuration similar to those employed in nonferrous reverberatory furnace practice are operated side by side. All the combustible gases produced by coal volatilization and CO generation by the high temperature smelting reduction of iron oxide feedstocks flow to the combustion section of one of the furnaces and are combusted with preheated air and/or oxygen introduced through overhead lances in a manner similar to that employed in reverberatory furnace practice.

Warner achieves a high degree of heat transfer by a design which provides for a very large clean metal surface area of the order of 200 $m^2$ for a plant capable of producing 2000 tons/day of hot metal.

In Warner's approach, the second furnace is employed for carbon absorption into the metal from a lump coal feed covering essentially the total surface area of 400 $m^2$. Due to the relatively poor mass transfer from solid coal to liquid metal, both a large surface area and high metal velocities are required. The text of the patent recommends that the method be performed with a very large proportion of molten carrier material circulation to molten metal produced with a preferred ratio of 288:1. Thus, for a 2000 ton/day plant a circulation rate of 24,000 ton/hr. is required. In an alternative operating mode for the dual reverberatory furnace system fine coal can be introduced onto the flowing metal surface with or without the simultaneous addition of fine iron ore feedstocks.

In yet another recent approach, Innes et al., in a paper entitled "Direct Smelting of Iron Ore in a Liquid Iron Bath - The HIsmelt Process" presented at the 71st Steelmaking Conference, Toronto, April 1988, describe a process in which coal fines and iron ore fines are injected into a molten iron bath together with top and bottom injection of oxygen and other process gases. The use of an iron bath as a reaction medium is common practice in steelmaking as in the Q-BOP process and bottom injection of coal fines is practiced in both the European and Japanese steel industries. The HIsmelt technology relies entirely on the simultaneous injection of fine iron ore and coal and the resulting simultaneous reaction sequences in the iron bath. These simultaneous reaction sequences involve: coal devolatization; char formation; partial combustion; carbon dissolution into metal; slag formation; sulfur release from the coal; sulfur partitioning between gas, slag and metal phases as well as iron ore melting and reduction. Excellent reaction kinetics are favored by the high temperature of the bath and the high degree of turbulence arising from the injection of the various components.

The top injection of oxygen is a key component of this technology and involves top blown lance technology similar to that employed in BOF practice. In the HIsmelt case, the top surface of the bath is highly agitated and the gases being released are highly combustible so that the top injection of oxygen results in an intense post combustion zone above the bath under conditions which favor good heat transfer to the melt. However, due to the combined injection of iron ore and coal into the bath, the largest possible generation of gases takes place and fully effective combustion at the top surface of the bath may not be achieved. Under these circumstances the overall heat transfer efficiency will decrease. It is clear that the overall effectiveness of the system is strongly dependent on the degree of post combustion achieved and the proportion of combustion energy returned to the iron bath.

In the field of continuous steelmaking, earlier work has been reviewed by Fukuzawa (Trans. Nat. Res. Inst. for Metals, Vol. 27, No. 2, 1985). Motivation for seeking effective continuous steelmaking technology is driven by increasing demands for higher quality steel products and the energy and environmental benefits of reducing BOF slag volumes. Current practice to reduce slag volumes has led to separate pretreatment steps before final BOF refining, and has achieved improved quality at the expense of increasing the number of batch processing steps required. In continuous steelmaking, the extent of conversion is a function of length as opposed to batch operation where it is a function of time. This introduces the concept of carrying out the separate steelmaking refining steps at different positions in a continuous flow channel.

Fukuzawa reviews seven different continuous steelmaking process types, all of which use a linear flow of molten metal and aim to achieve treatment of the metal stream in one pass. The treatment chemistry and methods for introducing regents and/or gas streams follow conventional practice. Furthermore, it is generally recognized that mass transfer is the rate limiting step and consequently conventional engineering principles can be applied for the determination of the flow, mixing and residence time criteria needed to achieve a desired degree of treatment.

Continuous steelmaking has not yet been established at the full commercial scale, and some critical practical aspects have therefore not arisen in the various small scale experimental studies carried out to date. In the refining of steel, high temperatures and aggressive slags are involved, and place a heavy burden on the refractory walls of the containing vessel. Refractory problems in conventional practice, which involves a sequence of batch operations, can be resolved by intermittent refractory patching or partial relining between major relining shutdowns. These options are not available in the case of continuous steelmaking, and the development of long life refractory systems will be an important aspect of continuous steelmaking process technology.

As will be revealed later, these problems can be reduced by the judicious use of existing technology including refractory surfaces that are cooled sufficiently to cause the formation of a frozen layer of metal which separates the molten metal from the refractory wall.

SUMMARY OF THE INVENTION

The present invention relates to an integrated metallurgical reactor for smelting and reduction of metal oxides which separates the key reactions and provides for separate slag removal in a compact vessel which permits optimal performance in each stage of the process. The process employs a minimum reserve volume of molten metal in which the smelting reduction can occur. This is of great significance with respect to the ease of start up and shut down of the process as well as being inherently energy efficient by minimizing the volume of metal to be maintained at high temperature. The provision of means for separate slag removal from different process sections is also important since the slag function is different at different locations in the reactor and slag composition can be chosen to suit the particular reaction chemistry.

The present invention employs a compact furnace in which the required reactions are carried out within the bulk of a hot metal bath or on its surface. The furnace is divided into two chambers or plenums. The coal reactions take place in an internal carburizing/combustion chamber, or plenum, and the iron smelting reactions are kept entirely separate in a separate outer flow channel chamber and plenum. The mineral matter in the coal, plus the lime added with the coal for sulfur control, form, in the first chamber, a high calcium slag which is removed at one location in the furnace. Due to the highly turbulent conditions in the inner chamber and the high metal to slag ratio, the slag is entrained as small droplets throughout the melt. A portion of this mixture is permitted to flow from the inner chamber to a settling channel that is between the carburization/combustion chamber and the smelting channel or chamber. This settling zone or chamber is provided to permit separation of the slag and subsequent slag discharge through an overflow-underflow weir system to maintain a gas seal. The gas volume of the first (settling) section of the outer channel is connected to the inner chamber, but is separated from the remainder of the outer channel. The coal slag is discharged and does not enter the channel chamber used for iron smelting reactions. Essentially slag free molten metal is permitted to pass via a submerged opening in a dividing wall between the settling channel or chamber and a second section of the outer channel forming a smelting chamber where, in the first part of the smelting channel section, iron ore feedstock or other feed material is added to the molten metal. This first part is called a feed zone in the second smelting chamber.

The remainder of the second smelting chamber is the smelting zone. The feed material can be either iron bearing fines or pellets, and may be introduced onto the surface or injected via submerged lances into the melt whereupon rapid melting and reduction occur by reaction with the carbon dissolved in the hot metal. The feed zone is divided into separate tanks or volumes by overflow weirs, and additional mixing can be provided, if desired, by inert gas injection so that the individual volumes between the overflow weirs are well mixed.

Gangue material in the iron ore feedstocks plus added fluxing agents form a slag in the second smelting chamber and this slag is removed at a separate location at the end of the second smelting chamber remote from the feed zone.

In this manner the two slag streams (coal slag and feedstock slag) are separated at all times and slag chemistry can be independently optimized for handling coal mineral matter and sulfur removal in the settling chamber and for iron ore gangue components in the smelting chamber.

The coal fines and lime are injected into the lower portion of the molten iron bath in the combustion/carburizing chamber preferably from submerged lances, that enter the reactor from the top. The coal and lime can also be bottom injected via basal tuyeres. Conventional coal reactions take place and the fine residual carbon char dissolves into the molten metal iron bath, raising the carbon content or carburizing the metal. The lime addition rate is selected to be compatible with the coal chemistry in order to simultaneously achieve the required level of primary desulfurization.

The surface of the molten iron bath in the combustion chamber (which also can be called a carburizing chamber) is in a high degree of agitation and turbulence due to the discharge of rising gases. Streams of molten metal and molten slag are ejected into the gas volume of the plenum above the molten metal bath. Preheated air and/or oxygen is injected above the surface of the molten metal bath to achieve a high degree of post combustion of the coal off gases, and to achieve a high degree of heat transfer back into the molten bath. Due to efficient combustion at the surface of the molten metal bath and the resulting efficient heat transfer to the molten metal, the exhaust gas temperature in the plenum is relatively low. Further tempering can be carried out by conventional methods, if required, to achieve a final off gas temperature suitable for heat exchange to preheat the combustion air prior to exhaust gas clean up and discharge, or the combusted coal off gas can be used for preheating the feed material.

The carburized hot metal- slag mixture exits the carburizing chamber and enters the settling chamber. As the metal/slag mixture slowly flows along the settling chamber, the slag separates out onto the surface of the metal and is discharged at the end of the settling chamber via the weir system. If a pig iron product is required, provision can be made adjacent to the slag discharge weir for an underflow metal discharge port. The carburized metal exits the settling chamber via a submerged opening in the end wall of the settling chamber and flows into the feed/smelting chamber portion of the outer channel which may be divided into several volumes. The separate smelting volumes are provided to ensure a sufficient time for the smelting reduction reactions and can be provided with inert gas injection to assure good mixing. The final smelting volume is preferably unmixed to aid good slag separation.

The iron ore feed material may be pre-reduced and/or preheated according to the overall process heat and energy balance objectives of the user.

Slagging agents may be introduced together with the feed material and the residual slag forms a thin film on the surface of metal flowing in the smelting channel. The molten metal flows from the inlet to an output end where a slag discharge port is provided. The slag discharge is through an overflow/underflow weir geometry which retains a gas seal in the smelting channel chamber.

The space above the molten metal in the smelting channel chamber is totally separated from the inner chamber and the settling chamber, and contains pure carbon monoxide formed by the reaction between the carbon dissolved in the hot metal and the oxygen in the feed material. The pure carbon monoxide can be used for preheating and pre-reduction of the iron ore feed material, if desired and also as an energy source either within the system by re-introduction to the carburizing combustion/chamber or externally for other purposes.

By separating the combustion chamber, and thus the coal off gas system (largely $CO_2$), from the second smelting channel chamber and the carbon monoxide gas developed in such chamber, the user has total control of carbon monoxide application options for reduction and/or energy requirements.

The coal addition rate in the carburizing chamber and the carbon level in the molten metal material entering the smelting channel chamber are selected such that the smelting reduction of the feed material in the smelting channel reduces the carbon content of the metal by about 0.5 to 1%.

The bulk of the hot metal carried in the smelting channel flows through a down-flow channel which connects to a central up-rise channel in the combustion or carburizing chamber. Flow through the system is induced by the injection of coal at the bottom of the up-rise channel, and the resulting buoyancy forces of the gases generated by coal devolitalization and gasification. The ratio of net downward flow of molten material from the smelting channel into the carburizing chamber to the finished product discharged from the end of the smelting channel is of the order of 20:1 to 50:1. That is 20 to 50 parts of molten metal from the smelting channel chamber are recirculated to the metal pool in the inner combustion/carburizing chamber for each part of metal product discharged as finished. Thus for a 2,000 ton/day plant with a recirculation ratio of 24:1 the recirculation flow is only 2,000 ton/hr. Higher circulating rates may be employed if required, and will result in a lower carbon decrease in the metal at the melting/reduction zone. The circulation rate may be controlled in general by adjusting the depth of the injection lance in the up-rise channel.

The hot molten metal product may be removed at the end of the smelting channel via an underflow/overflow discharge port located in the same general area as the smelting channel slag discharge port. The product may be directly discharged with a carbon level of approximately 2-3%, or preferably it is refined in a refining channel reactor comprising several reaction volumes in compartments separated by weirs in a channel. The first refining section is for desulfurization, and three well mixed volumes are provided by intermediate weirs. A small overflow port is provided in the wall separating the smelting chamber from the refining channel to permit the desulfurization slag to exit into the smelting channel and discharge with the ore slag. Alternatively, a separate slag discharge port from the desulfurizing zone can be provided if required. Desulfurization is achieved by injection technology using conventional conditioning and desulfurizing agents and gases. The desulfurized metal flows through a submerged port into the final refining section where conventional oxygen refining is carried out in a series of volumes separated by overflow weirs. As in the carburization chamber, submerged injection via lances penetrating downwards throughout the top of the plenum is preferred. Provision for discharge of the refining slag, again by overflow/underflow weirs is made in the final refining channel. The final slag discharge port may be located next to the final steel discharge port so as to have effective co-current flow of slag and metal or, alternatively, the slag discharge port may be positioned close to the point of entry of the metal into the final refining chamber so as to have a counter current flow of slag and metal.

The selected refining practice and the position of slag ports will generally be governed by the impurity levels in the molten metal caused by undesirable iron ore and coal components and by user preferred practice. The final steel product is discharged through a submerged port and overflow weir at the end of the refining channel. By placing the metal and slag discharges at opposite ends of the final refining channel counter current flow is employed and improved refining chemistries achieved.

In the mode of operation as described with the final metal flow into the refining section coming from the end of the smelting channel the temperature and carbon content are at low values within the circulating metal cycle and there will be a minimum energy content (both enthalpy and carbon) for use in the refining reactions. The potential for scrap additions for cooling will therefore be at a minimum. An alternative configuration which permits maximum scrap addition is to take the final metal stream from the settling chamber at the opposite end to the bulk flow i.e. close to the exit from the central carburizing chamber where both the temperature and carbon content are at the highest value in the molten metal cycle. In this case the flow in the refining channel is reversed relative to the previously described case. The rate of operation for the desulfurizing and refining functions does not change but a much higher scrap addition rate can be accommodated.

The gas volumes in the steel refining chamber, or plenum, above the molten metal in the refining channel and in the smelting channel chamber or plenum above the smelting reaction channel may be connected so that all the carbon monoxide formed by either reduction of iron oxides in the smelting channel chamber or by removal of carbon from the hot molten metal in the steel refining channel, are comingled to provide a single source for carbon monoxide utilization. If process chemistry indicates, individual gas compartments or chambers can be provided for the steel refining channel. At selected points along the refining channel, sealed feed ports are provided to permit the addition of scrap metal for temperature control of the melt, as in conventional refining practice. It is also possible to use these ports for the controlled addition of alloying elements to continuously produce a range of alloy steels. If separate slag practice is required in the refining channel, slag dams and underflow metal openings are used to avoid commingling of the separate slags.

The coal requirements for the process are governed by the iron ore feedstock or feed material, the selected chemical reaction sequence as outlined above and the auxiliary coal needs to meet overall energy (heat) requirements. Additional energy input can be accomplished by excess coal addition with a corresponding bottom oxygen injection, top oxygen addition or a combination of both. If temperature adjustment is required in the smelting/reduction chamber, the injection of oxygen provides for heating and the injection of carbon dioxide provides for cooling, both yielding pure carbon monoxide in the gas plenum above the melt.

The iron oxide (iron ore) feed material can be either pellets or fines in form and pre-reduction, if employed, can be practiced to form either 100% wustite or higher degrees of reduction before feeding the feed material into the smelting channel chamber. The amount of pre-reduction is selected (see Equations 1-6) to optimize overall process energy requirements. In cases where the flow of carbon monoxide needs to be maximized for external energy requirements, the iron oxide is fed without prereduction. It should also be noted that the process is generally applicable to the smelting reduction of any iron oxide bearing feedstock including natural ores such as chromite ilmenite etc. and waste materials such as BOF or EAF dusts, as well as the melting of metal feedstocks.

Coals with a wide range of analysis can be used and operating conditions selected according to the fixed carbon level of the coal (which contributes to the molten iron bath carbon level) and the volatiles (which contribute to the post combustion energy balance). For low volatile high carbon coals, higher levels of bottom oxygen injection are required to provide the required heat input. For higher volatile coals with lower fixed carbon, coal rates will be determined by the carbon demand to maintain molten bath carbon content values. In the latter case, excess post-combustion energy may be available.

The process is very flexible with respect to coal composition and permits optimization of coal selection for price rather than being constrained by narrow coal chemistry specifications imposed by process considerations.

The entire process is energy efficient and uses compact apparatus which has separated sections which can be modified to meet changing requirements by changing the melting and/or refining channel configurations, adding desulfurization sections, altering coal or oxygen feed, and permitting the addition of gases and/or reagents at any point in the outer melting or refining channels to achieve the required product chemistries and overall energy balance. The gases from each reaction section are also separated for control and best utilization of energy.

In cases where there is no need for an external energy supply, the carbon monoxide generated in the outer chamber is used to provide heat to the melt in the inner, combustion chamber. This can be done by providing connecting pipe work between the inner and outer plenums with associated preheated air jets so that a high degree of combustion is achieved and energy transfer to the melt in the carburizing chamber is maximized.

An important part of the invention is the use of "freeze lining" practice in which external cooling is applied to the refractory walls that are in contact with molten metal or slag. The rate of removal of heat is controlled so that the temperature at the refractory wall surface is below the freezing point of the metal or slag, and a frozen metal or slag layer forms on the surface. The thickness of the frozen layer depends on the temperature of the melt and the heat transfer through the frozen layer and refractory to the cooling medium. In conventional practice, particularly for electric arc furnaces, cooling is provided by water cooled wall panels. This provides for very strong cooling and, unless the hot water/steam can be used in an adjacent boiler facility, there is a substantial heat loss. There are also important safety aspects related to water cooling and molten metal baths. In the present invention, it has been found that by proper design, cooling sufficient to provide the required freeze lining can be achieved by providing small diameter channels in the refractory and cooling with a high velocity air flow. In this manner, all melt-/refractory surfaces are protected by a frozen layer of the melt itself, and refractory wear problems are essentially eliminated. Furthermore, the heated air can be used as a portion of the preheated air requirements for combustion of the coal volatilization and gasification products. It should also be noted that the process operates in a truly continuous manner and that the thermal and chemical stresses encountered in conventional batch steelmaking are thereby avoided.

The process is of particular applicability for iron ore mining properties where iron ore fines are pelletized such as on the Mesabi Iron Range in Northern Minnesota. U.S. Pat. No. 4,577,838 (Mar. 25, 1986) shows how a plasma reactor can be used to provide reducing gases from solid fuels for the reduction of taconite pellets in a conventional direct reduction shaft furnace and also supply gases for pellet induration. Alternatively, it is claimed that a portion of the iron ore fines prior to pelletization can be introduced directly to the plasma reactor together with the solid fuel fines. The disadvantages of this approach are the high cost of electric power required for the plasma reactor and the mixed quality of the off gases which contain all of the volatile and partially combusted products from the solid fuel together with the carbon monoxide produced by the reduction of the iron ore.

In the present invention if, for example, the iron ore fines feedstock is taconite concentrate then the major iron oxide present is magnetite ($Fe_3O_4$). If this feed is treated in the present invention i.e. according to equation 4, then the production of each lb. of iron yields 0.667 lb. of CO with a combustion energy content of 4,750 Btu/lb, i.e. 3,163 Btu/lb. Fe. Energy requirements for taconite pellet induration are of the order of 150 Btu/lb. which can be provided from the production of approximately 0.05 lb Fe. Thus if approximately 5% of the taconite concentrate is removed prior to induration and fed into an integrated metallurgical reactor of the present invention the clean carbon monoxide produced in the separate smelting reduction chamber would provide all of the energy required in the pellet induration furnaces. Since the fuel for this combined process would be Western coal with an energy cost of approximately 60% to 70% of the cost of natural gas there are substantial energy cost benefits to the taconite pellet industry. In addition to the energy cost benefits the value of the small proportion of metal product is considerably higher than that of the taconite pellets.

DESCRIPTION OF THE PREFERRED EMBODIMENTS

Figure 1:
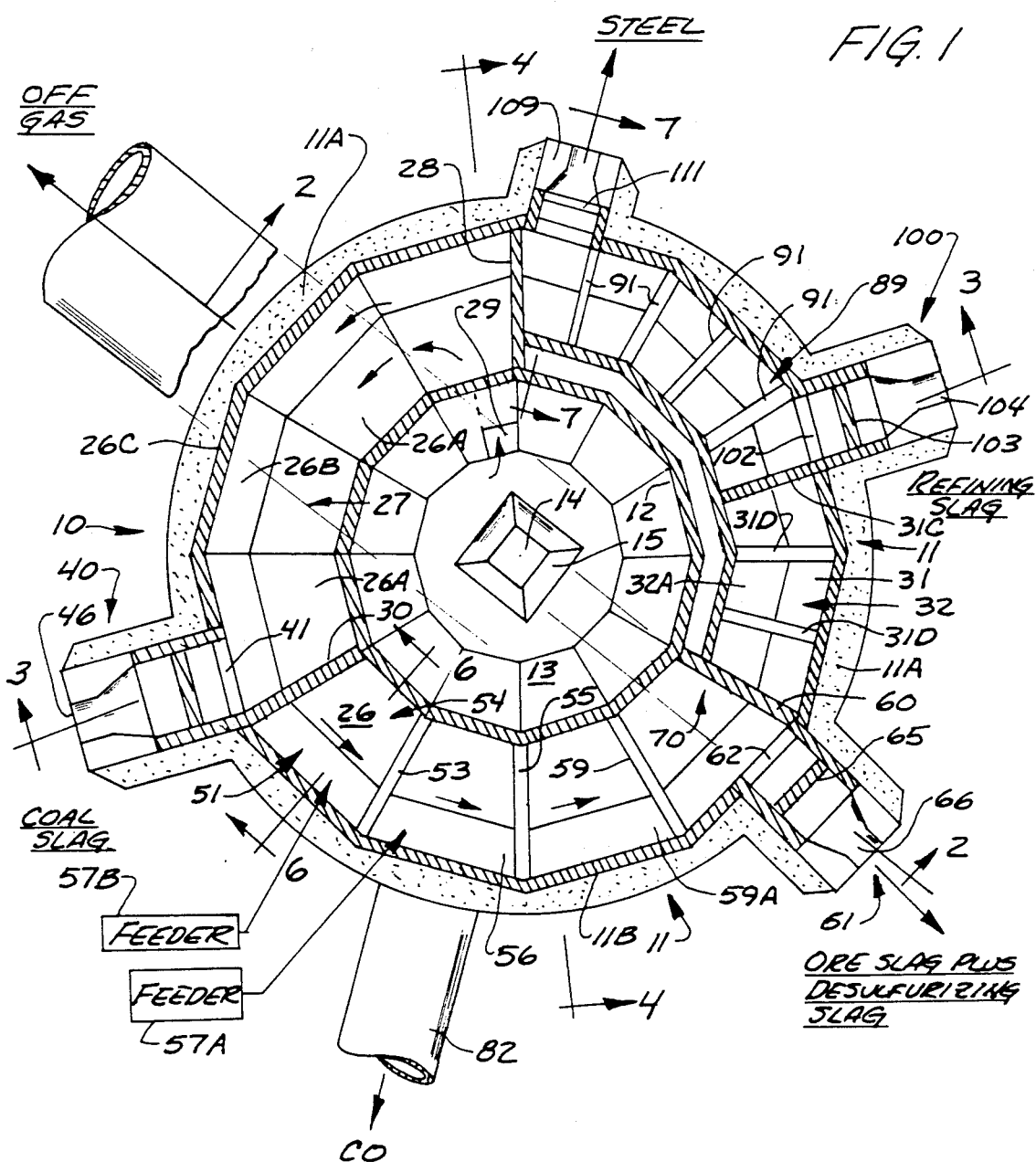
FIG. 1 is a top plan view of an integrated metallurgical reactor made according to the invention.

FIG. 1 is a top plan schematic view of a typical integrated metallurgical reactor made according to the present invention, indicated generally at 10. The walls of the reactor are shown schematically in section, in that the top plenum forming portions of the reaction chambers are removed for clarity, and the walls are sectioned to illustrate in general, known wall construction. Outer portions of the wall can be backed with suitable insulating refractory brick or other known construction techniques for metallurgical reactors.

The reactor 10 has an outer peripheral wall 11, which includes an insulating brick section 11A, and a first liner wall 11B. The reactor has a central combustion/carburizing chamber formed with an encompassing divider wall 12. The chamber has a base wall 13 as shown in FIG. 2.

The base wall 13 has a central opening leading to an up-rise channel indicated at 14 which is formed by pyramidal downwardly tapered walls 15. The combustion/carburizing chamber 16, which is formed by the wall 12, is covered or enclosed by an upper inclined wall 20, which as shown forms a plenum chamber portion 21 at the upper end of the carburizing chamber. The plenum chamber 21 is above the level of a violently agitated, reacting molten metal-slag pool 36 formed in the chamber 16. Chamber 16, including plenum 21, is also called a first chamber in the reactor.

Figure 2:
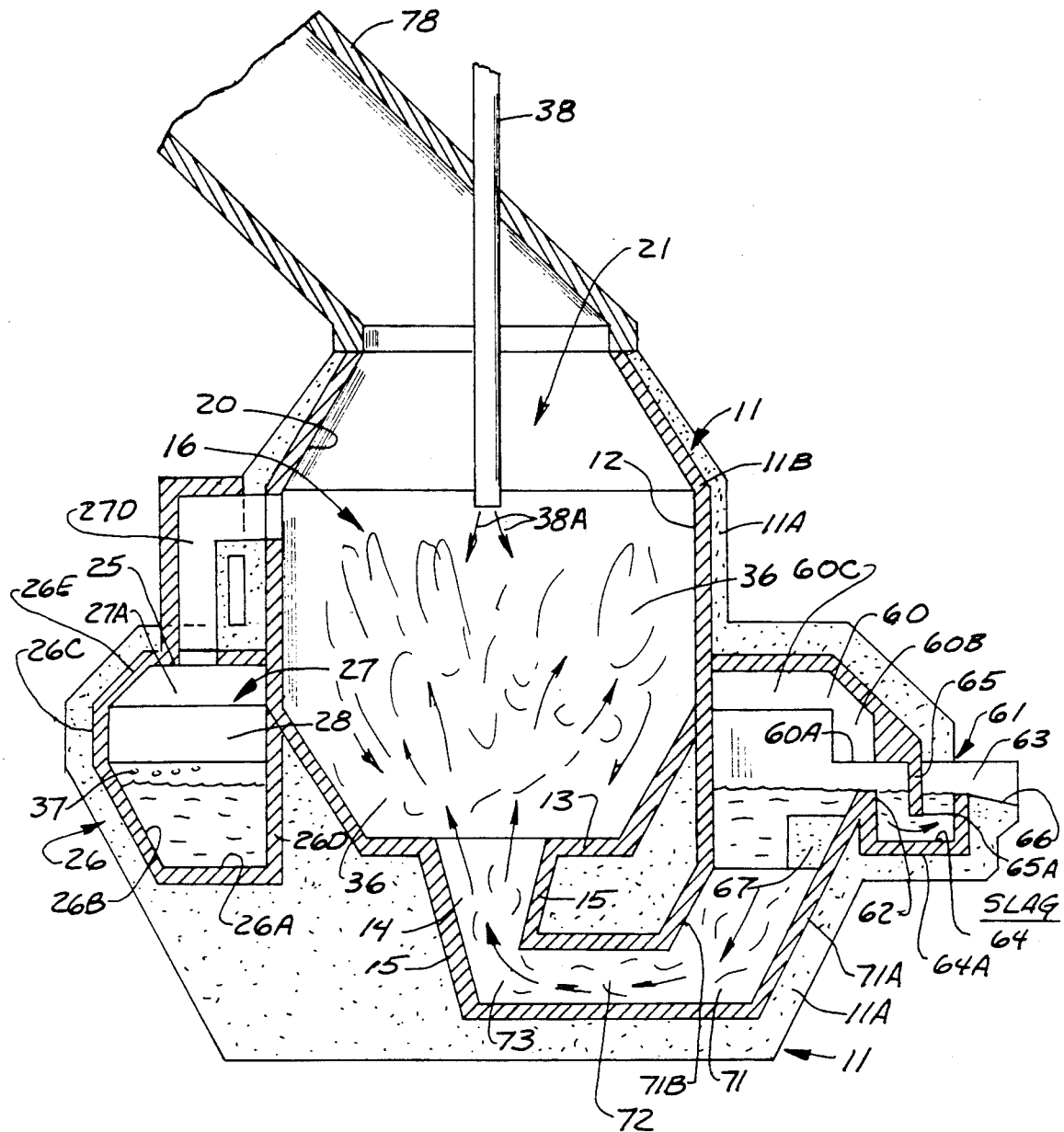
FIG. 2 is a sectional view taken as on line 2—2 in FIG. 1.

As shown in FIG. 2, the periphery of the wall 12, at a level below the upper section 20, is joined with a laterally extending part annular wall 25 on the outside of the chamber 16. A channel forming wall 26 is also part annular and wall 25 forms a cover over the channel formed by wall 26. Wall 26 includes a floor 26A which is horizontal and joins an inner wall 26D, an upwardly tapered portion or section 26B that is then connected to an outer vertical wall section 26C and an inwardly tapering portion 26E which extends, again, part annularly around the chamber wall 12 and is spaced from wall 12. The inner vertical wall 26D is joined to wall 12 to form a channel-chamber 27. The walls 26A, 26B, 26C and 26D contain and permit settling of the agitated molten metal-slag introduced from the metal-slag pool in the carburizing chamber 16. The chamber 27 is thus a settling chamber and it has an upper plenum portion 27A which is above the level of the molten metal and slag in the settling chamber. The slag shown at 37 rises to the top of the molten pool. Any gas entrained in the metal which flows from the carburizing chamber 16 into the settling chamber 27 collects in the gas plenum in the upper section of channel 27 and is vented back into the upper portion of the carburizing chamber via vent pipe 27D.

As can be seen in FIG. 1, the tapered wall 26B and the floor 26A that form the settling chamber-channel are made so that the outer wall segments 11B form straight line segments joined end to end to extend around a portion of the wall 12. Thus the floor 26A and wall 26B are segments that are joined end to end along radial edges. The settling chamber 27 extends from a location starting at a first or inlet end wall 28, to a second outlet end divider wall 30 for the settling chamber. The end walls 28 and 30 are generally radially extending from the central axis of the carburizing chamber 16 and form blocking walls to close the ends of the settling channel-chamber 27. The walls 28 and 30 are vertical walls which extend to and join the upper wall 25 and wall 26A, B, C, D, and E to form closed end walls for settling channel-chamber 27. Wall 28 can be seen in FIG. 4. This forms the enclosed plenum chamber 27A that extends partway around the inner combustion/carburizing chamber 16. Wall 30 can be seen in FIG. 6 as well.

There is an opening 29 in the inner wall 12 adjacent to wall 28. The floor 13 of the carburizing chamber 16 is joined by a section of floor 26F. The molten metal-slag mixture is highly mobile and will flow into the settling chamber 27 through the opening 29. The molten material builds up in the settling channel-chamber 27 to a level controlled by a coal slag weir 40, which is adjacent to wall 30, at the exit end of the settling channel-chamber 27. As the molten material (melt) in the settling channel-chamber settles, a molten pool of metal is formed with coal slag 37 coming to the top.

Figure 3:
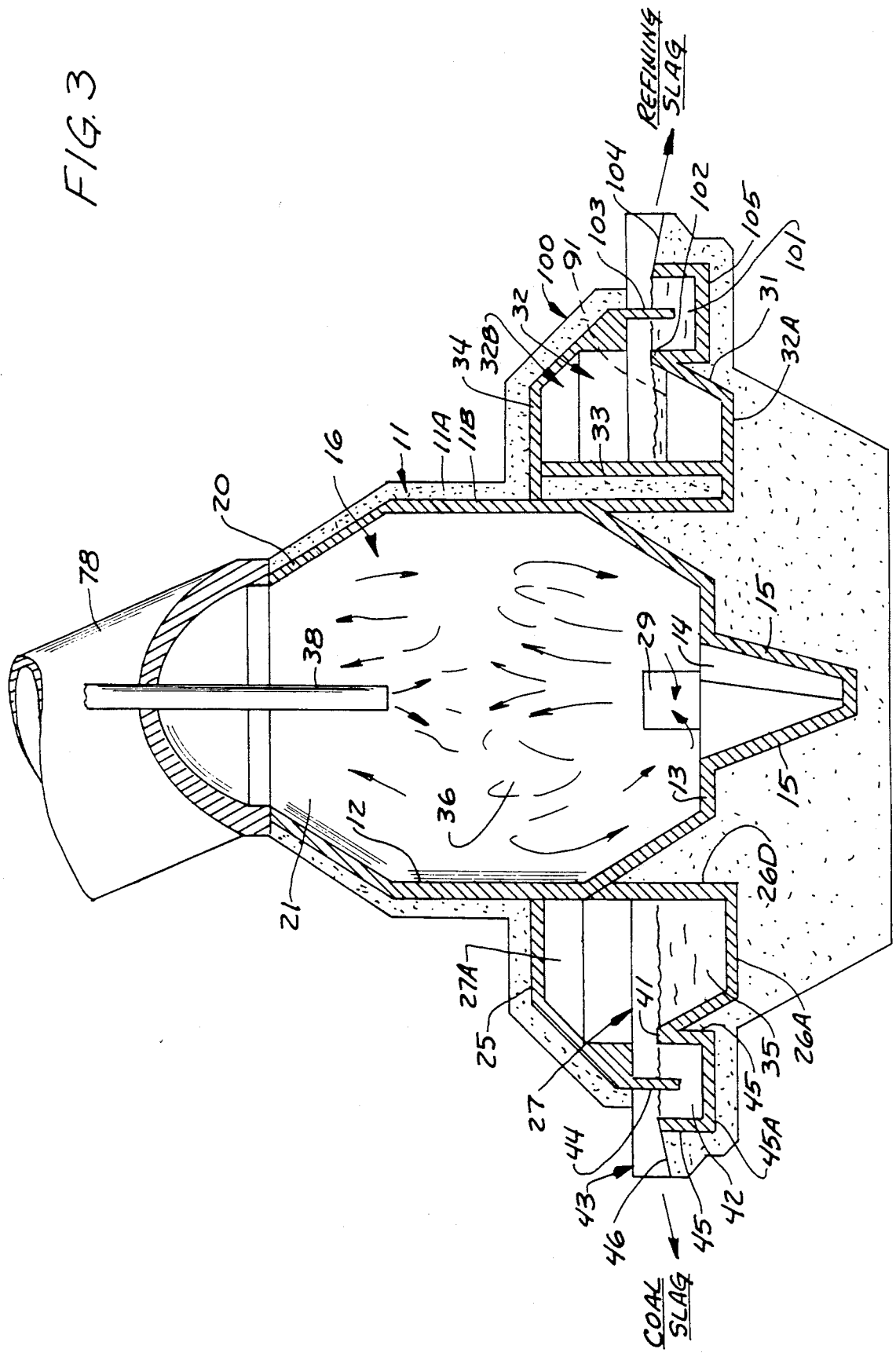
FIG. 3 is a sectional view taken as on line 3—3 in FIG. 1.

In the combustion/carburizing chamber 16, a reaction takes place to carburize a quantity of molten metal in a melt pool which flows into the settling channel chamber 27 and which is shown at 35 in FIG. 3, for example. Because coal is injected in the carburizing chamber 16 there will be coal slag carried into the settling chamber 27 which will collect or form on top of the molten metal pool 35. Coal gas products are also generated in the carburizing chamber 16. The coal gases are combusted in a highly turbulent region at the surface of the molten metal-slag melt 36 in chamber 16 by the injection of high velocity, pre-heated air and/or oxygen from an injection lance 38. The jet or jets 38A may be positioned along the central vertical axis as illustrated, or there may be a multiplicity of lances arranged to optimize combustion efficiency. The combusted off gas is removed in a manner which will be explained. The coal slag indicated at 37 on top of the settled melt pool is removed through overflow/underflow weir system 40 to insure a gas seal, as shown in FIGS. 1, 3 and 5.

Figure 5:
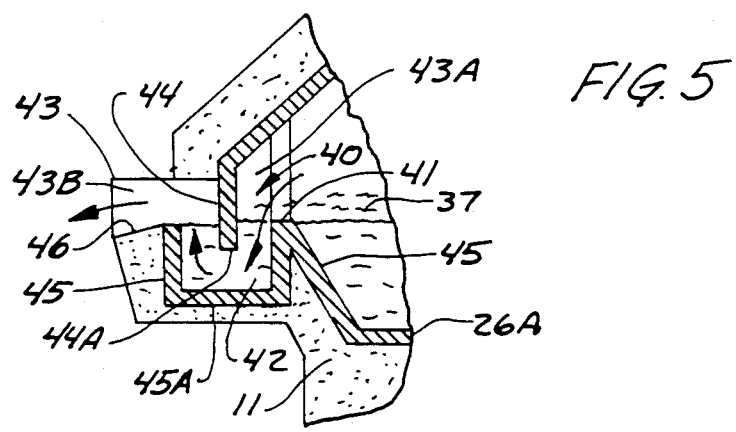
FIG. 5 is a fragmentary sectional view of a slag discharge weir taken along the same line as FIG. 3.

An overflow weir wall 41 is shown in FIGS. 3 and 5, and provides an overflow for coal slag to exit into a trough 42 that has an underflow wall, or slag dam 44 which has a lower edge 44A below the level of the weir 41 to prevent gas from escaping from the settling chamber 27.

The trough 42 extends radially outward from the settling channel-chamber 27. Trough 42 is defined by vertical, radial side walls 43 that have sections 43A on the interior of the chamber, and the vertical downwardly depending underflow weir wall 44 is placed between the vertical walls 43. The wall 44 has a lower edge 44A that defines a level below the level of the slag 37 on the molten pool 35 on the interior of the channel-chamber 27. The underflow trough 42 is defined by a pair of transverse vertical walls 45 that also extend between the wall sections 43A (on the interior) and wall section 43B, which are to the exterior of the underflow vertical wall section 44. The walls 45 are joined by a horizontal bottom wall 45A that is spaced from and below the lower edge 44A of the underflow gas seal wall 44. An outflow drain surface 46 provides a drain path for slag to move outwardly from the reactor to a desired location. The upper edge of weir wall 41 establishes the level of the melt pool of molten metal material 35 in the lower portion of the settling chamber 27.

Figure 6:
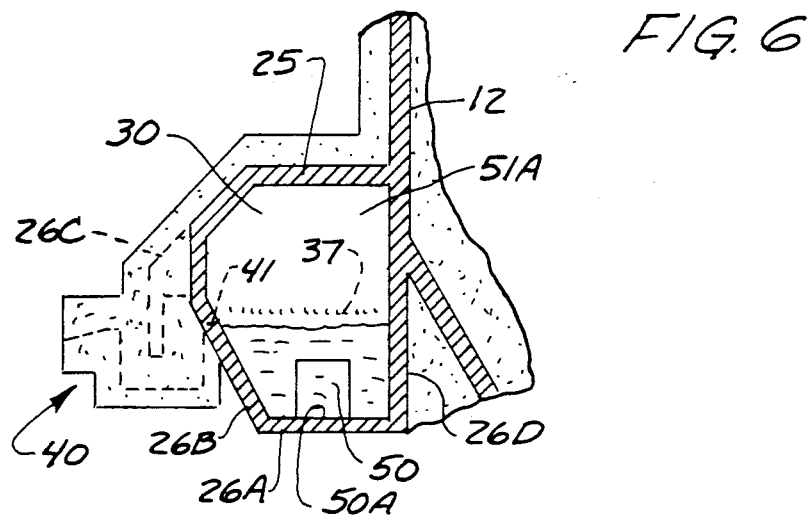
FIG. 6 is a fragmentary sectional view taken on line 6—6 in FIG. 1.

The settling chamber 27 defines a flow channel or path for molten, carburized material from the carburizing chamber 16 to a part annular feed and smelting channel-chamber 51 that aligns with and is end to end with the settling channel-chamber 27. The smelting channel 51 is defined by a continuation of floor 26A, and walls 26B, 26C and 26D, by the end wall 30 at the start of the smelting channel and by a remote end wall 60. The end wall 60 is spaced from the wall 30 a sufficient distance to provide a feed and smelting channel of suitable length. The flow of molten metal into the smelting channel-chamber 51 is via a submerged metal outflow orifice or port 50 in wall 30 as shown in FIG. 6. Outflow port 50 is below the level of the molten metal pool 35 established by the edge of weir wall 41 by a sufficient amount so that the molten metal outflow from the settling channel-chamber to the smelting channel through port 50 does not include any of the slag 37 floating on top of the metal pool 35 in the settling channel-chamber. The lower edge 50A of port 50 aligns substantially with the upper surface of the floor 26A of the channel, and thus metal will pass into the smelting channel 51 defined by the floor 26A and walls 26B, 26C and 26D, which extend around a portion of the periphery of the carburizing chamber 16.

A first channel divider overflow weir wall 53 is provided and forms a radial wall as shown in FIG. 1. Wall 53 is spaced annularly a selected distance from the end wall 30, and forms a compartment or tank 54 for providing a separate volume of molten metal in the smelting channel between the wall 30 and the weir wall 53. A second channel divider overflow weir wall 55, comprises a radial wall in the channel 51 and is positioned annularly downstream from the wall 53, to form a second compartment or tank volume 56 between the weir wall 53 and the weir wall 55. Feeders shown at 57A and 57B schematically can be used for providing iron oxide or iron ore material to compartment 56 and/or 54. The feeders can be surface feeders and/or injection lances of conventional design passing through the walls 26E or 25 of the channel 27. The feed material will be iron oxide, preferably fines, and containing such added agents as necessary for forming a proper slag such as a fluxing agent. Generally, a taconite concentrate, for example, will have gangue components, and a certain amount of silica, probably in the range of 3 to 5 percent, which will form a slag on the otherwise clean surface of the molten metal in the smelting channel 51. The molten metal comes from the channel 27 without any coal slag on it, but with a concentration of carbon that is used in the smelting channel chamber for the smelting reduction reaction.

Figure 4:
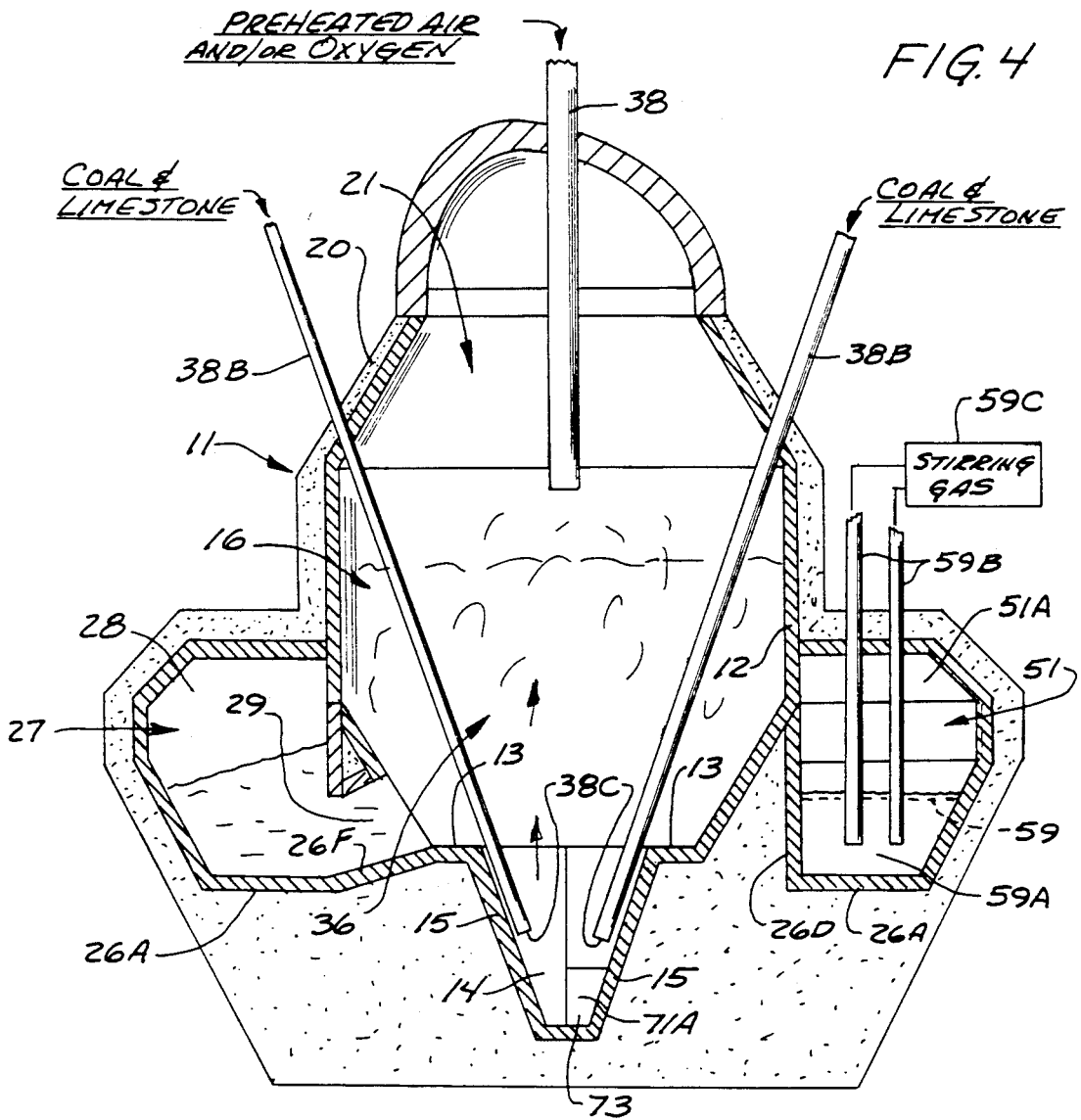
FIG. 4 is a sectional view taken as on line 4—4 in FIG. 1.

As can be seen, the smelting channel-chamber 51 forms a flow path as indicated by the arrows in FIG. 1 peripherally around the carburizing chamber 16, on the outside of the wall 12. A control weir wall indicated at 59 can be used for controlling molten metal levels, and for improving mixing and forms a third tank or separate volume 59A. A fourth tank or volume is formed between walls 59 and 60. As shown in FIG. 4, lances 59B may be used to inject stirring gas from a source 59C which can be any pressurized inert gas that provides a stirring, lifting action to agitate and mix the molten metal being smelted. Gas stirring can be provided into any of the smelting reduction chambers as desired, and the number of chambers can be adjusted according to the required reaction times.

At the outlet end wall 60 of the smelting channel 51 several functions can take place. As shown in FIG. 2, a slag outlet underflow/overflow outlet 61 is formed by an overflow weir wall 62 that is between a pair of vertical walls 63, 63 forming a trough 64. The upper edge of weir wall 62 provides a flow into trough 64 that is filled with molten slag. Trough 64 is divided by an underflow weir wall 65 that has a lower edge 65A spaced upwardly from the bottom wall 64A of the trough 64. The slag that is established on the surface of the molten metal material flowing in the smelting channel-chamber 51 flows over the overflow weir 62, and past the underflow weir 65, and finally discharges over an outlet edge into an outlet channel 66. The smelting channel-chamber has a plenum chamber 51A that is isolated from the gases in the settling chamber 27, but which may connect with the upper plenums in the subsequent refining chambers.

As seen in FIGS. 1 and 3, a steel refining channel or path indicated generally at 32 is provided at a location spaced outwardly from wall 12, near the outer peripheral wall II, and is defined by a bottom wall 32A and outer wall segments 31, and an inner vertical wall 33 that has segments that correspond in length to the outer wall segments 31 defining the steel refining channel. The steel refining channel commences at wall 60 where molten metal product is introduced after smelting reaction in the smelting channel chamber, and is terminated at vertical wall 28 at an outlet end. An intermediate divider wall 31C is used to separate the desulfurization section from the final refining section. Steel refining channel chamber 32 also can be enclosed with a part annular upper wall or cover wall 34, as seen in FIG. 3, which joins wall 12 above wall 33. The upper wall 34 joins the wall sections 31 to form an enclosed plenum chamber 32B over the molten metal in the refining channel chamber 32. The view of FIG. 3 is across an outlet weir, exiting from the refining channel chamber 32. The refining channel is enclosed by cover wall 34, and walls 31 and 33. The refining channel chamber and the smelting channel chamber are separated from each other by wall 60 except for metal flow port 67 where molten product from the smelting channel is passed to the refining channel and a back flow weir opening 60B having an edge 60A. The gas spaces above the refining channel and smelting channel are interconnected via opening 60C at the top of wall 60. The plenum chambers 51A and 32B are isolated from chambers 27A and 21. The flow through the refining channel and the control weirs therefore will be described subsequently.

As an alternative the port 67 can be closed and wall 60 made solid. The inlet to the refining channel can be made in wall 28 so material with greater retained heat will be refined into steel. The outlet from the refining channel would then be near wall 60. The port 29 would also be moved counter clockwise a selected distance so the molten product would have a chance to settle a short while before entering the refining channel or zone.

In this reactor, as configured, preferably about 1/25 of the molten metal product flowing through smelting channel-chamber 51 is exited into the steel refining channel 32. The product outflow is via an underflow or submerged outlet orifice 67 in wall 60 establishing an underflow weir shown in FIG. 2. As can be seen, the orifice 67 is below the level of the weir 62, so that product without slag is discharged into the steel refining channel 32.

Twenty five parts of the molten metal are recycled and flow to the carburizing chamber as opposed to the one part of the product which goes forward to the steel refining channel. The bulk of the molten metal flows through a downward orifice or opening formed as shown at 70, at the termination of the bottom wall 26A of the smelting channel-chamber 51, and this opening 70 leads into a conduit 71 that is formed by downwardly extending walls 71A and 71B (see FIG. 2) which pass down around the lower end of the walls 15 defining the interior up-flow channel 14. The conduit 71 has a horizontal section 72 having an outlet port 73 leading into the up-flow channel 14.

The recycled flow inlet port 73 opens to the up-flow channel 14 as can be seen at FIGS. 2 and 4. In FIG. 4 one is looking into the port 73 and will see the vertical sidewall of conduit 71. Port 73 opens into the very lower portion of the pyramidal wall section 15, and the up-flow channel 14 formed thereby.

As shown in FIG. 4, coal fines and limestone, for sulfur control, plus any fluxing agents that may be desired, are introduced into the combustion-carburizing chamber 16 at the lower end of walls 15 through the use of one or more injection lances 38B, which extend through the upper section of the inner chamber 20 and extend down through the molten metal-slag pool 36 into the center of the pyramidal walls 15, near the top of the orifice or port 73 leading from the channel 72. The hot molten metal causes the coal to gasify and the gases and material from the bottom ends 38C of the tubular lances 38B form a rising, pneumatic lift pumping effect carrying the molten metal from the up-flow channel 14 upwardly, to the upper parts of the molten metal-slag mixture 36 in the carburization/combustion chamber 16. By adjusting the level of the bottom ends 38C of the lances 38B the pneumatic lift driving force can be adjusted to achieve the desired metal circulating rate. The action of the coal fines tends also to carburize the molten metal, that is, add carbon to it in a typical reaction, and form the slag 37 that rises to the top of the metal pool 35 in the settling channel-chamber 27. The lance 38B, or separate lances, can also be used for injecting oxygen or air for combustion of materials within the turbulent melt/gas volume, thereby adding additional heat to the system.

The gases that collect in the plenum 21 are contained within the enclosed plenum 21 and are discharged through an off gas stack 78 shown in FIG. 2. This is the only outlet from the plenum chamber 21 where gases can escape. The off gas can be discharged to a desired location and used as a heat source for preheating feed streams, if desired.

The lances 38B for injecting fine coal and limestone can be positioned within the combustion-carburizing chamber so as to fit closely along the pyramidal walls 15.

Because the coal slag weir 40 has the overflow/underflow arrangement, combustion gases cannot escape from that area, and gas will not escape into the smelting channel-chamber 51 because the molten metal in-flow to the smelting channel-chamber is through a submerged or underflow port or orifice 50, over a bottom edge 50A. The whole of the reactor system is thus closed to the atmosphere which permits excellent environmental control and also permits operating at pressures above atmospheric if desired.

The plenum 51A (see FIGS. 4 and 6), in the smelting channel-chamber 51, carries pure carbon monoxide (CO), and the CO can be separated out and carried through an outlet conduit 82 (FIG. 1) completely separate from the combustion-carburizing chamber gas. The CO can be used in a variety of ways, as previously mentioned. Whether used externally or internally the hot gas can be routed through heat exchangers to return energy to the reactor system, for example, by preheating air injected to the carburization chamber 16 or for preheating the iron oxide feed material that is being fed in by feeder 57. This is done in order to minimize energy costs overall and to thereby improve the economics of the operation.

The total volume of molten metal that is necessary for producing finished product in a reasonable quantity is substantially reduced from prior devices, and the generally part annular smelting channel positioned around the central combustion chamber not only separates out the two different reactions (combustion-carburizing and smelting), but reduces space requirements, makes the reactor unit quite compact, and improves overall energy efficiency by minimizing external surfaces.

Figure 10:
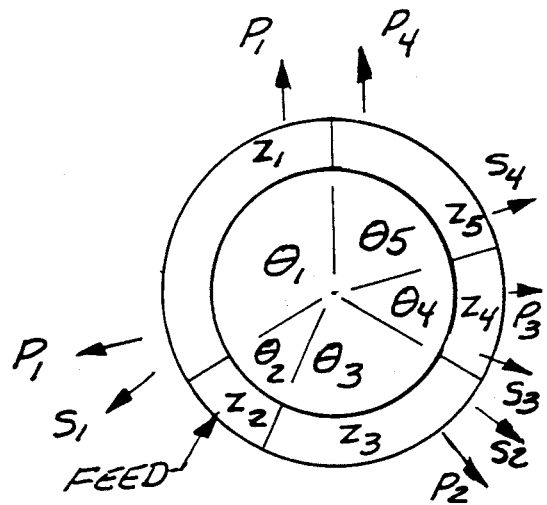
FIG. 10 is a schematic illustration of the reactor of the present invention showing the zones of operation of the outer channel.

The refining of the metal product after smelting can take place as part of the reactor system shown in FIG. 1, or it can be done in an entirely separate location by conventional or non conventional methods as desired. The product removed from the smelting channel 51 could be used differently than that shown here, and if, for example, an intermediate carbon pig iron is required, the refining channel 32 is not required. The metal product can be taken from the end of the smelting channel 51 by providing a metal discharge port located adjacent to the slag discharge trough 64 of similar construction to the steel discharge port indicated generally as 109 (FIG. 10 as will be explained). As described previously, if a higher carbon pig iron is required the metal product can be removed prior to the smelting zone or section.

However, if the steel refining channel 32 is provided, the first portion 32C of the refining channel is a closed section for desulfurization of the molten material and may have several tanks or compartments divided by walls 31D forming overflow weirs similar to walls 53, 55 and 59 in channel 51. Conventional metal pretreatment and desulfurizing agents may be injected into the melt, and the residence time and number of mixing compartments are selected to achieve the required degree of desulfurization. The desulfurization slag may be discharged separately through an overflow/underflow system as for the smelting slag indicated as trough 64 and located adjacent to it. Alternatively, an overflow discharge port 60B can be provided through end wall 60 at a desired level 60A to permit the desulfurization slag to join and discharge with the smelting slag. The weir walls 31D and wall 31C would be used to insure a molten pool level at which edge 60A would serve to provide slag back flow.

The second portion 89 of the refining channel, between the wall 31C and the refined steel discharge 109, permits conventional oxygen blown refining practice, but is carried out in a series of separate well mixed tanks or compartments established by spaced dividing weirs 91 forming overflow weirs. The refining slag is discharged from a refining slag weir indicated generally at 100, which includes a channel member 101 having an overflow weir or wall 102 and an underflow wall 103.

Figure 7:
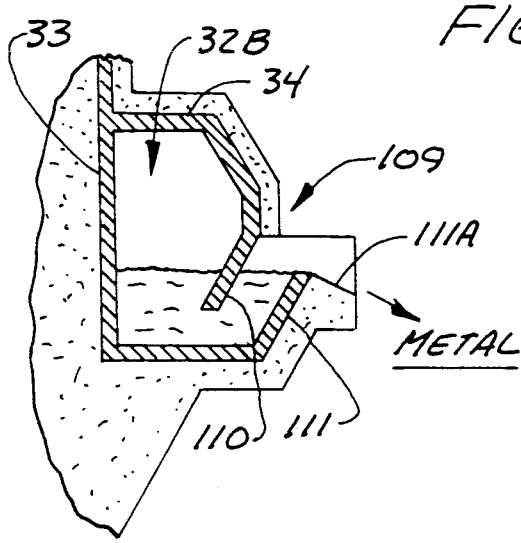
FIG. 7 is a fragmentary view taken on line 7—7 in FIG. 1.

A discharge trough 104, provides an outlet from the trough 105 having the underflow weir 103. The preferred flow pattern is for countercurrent flow of metal and slag with refining slag discharge and metal (refined steel) discharge at opposite ends of the refining channel portion 89 as indicated. Alternatively, co-current practice can be employed if desired by moving the slag discharge weir 100 to a position immediately adjacent to the metal discharge weir 109. The end wall 28, which forms the termination of the refined steel processing channel ends in the refined steel discharge underflow-/overflow weir 109 (FIG. 7) that includes an underflow wall 110 that is between the wall 33 and a wall 111. The steel product then flows out over the upper edge of wall 111 to a discharge trough 111A.

Thus, the reactor includes all of the necessary components for providing refined steel in a compact manner, and keeps the reactions for heating or combustion and for smelting separate, so that complete control over the chemical make-up of the final product can be achieved. In the process, between 20 and 50 parts or more of the molten metal are recycled through the combustion chamber, and as specifically shown, 25 parts are recycled to one part of product that goes into the steel refining cycle or which otherwise is removed from the process.

An important part of the practice of the invention is the selection of flow rates and residence times in the various sections of the integrated reactor. This is generally achieved by determining the total volume required in a given section as the product of total flow and required residence time, and selecting the cross-sectional area and arc length of the channel accordingly. Typical residence times for settling and for the smelting reaction are in the range of 1 to 3 minutes, while total residence time for the refining reactions may be of the order of 30 minutes or more. The residence time in the refining section can be increased by increasing the width of the refining channel up to a limit at which the space between walls 33 and 12 disappears and a single wall separates the inner combustion carburizing chamber 16 from the refining channel 32 in a similar manner to the construction illustrated for wall 12 separating the inner chamber 16 from the smelting channel 27. It is clear that a wide range of processing conditions can be designed into a particular embodiment of the invention to meet the smelting and refining requirements for particular raw materials and product specifications.

Figure 8:
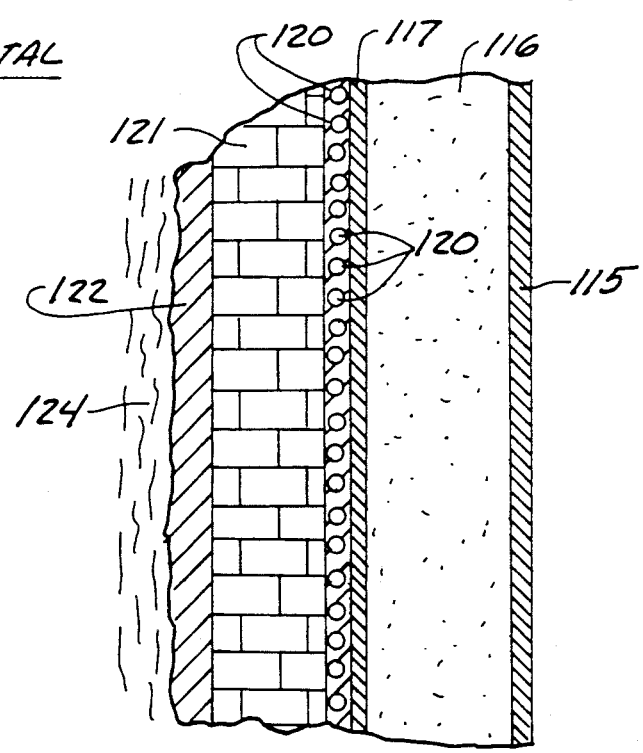
FIG. 8 is a enlarged sectional view of a suitable wall construction used with the reactor of the present invention.

While the walls of the reactor can be made in any desired manner, FIG. 8 illustrates a preferred construction. The wall shown includes an outer boiler plate 115, and at least six inches of insulation indicated at 116. Then, a ¼-inch boilerplate 117 would be an inner liner, and a plurality of individual air tubes indicated at 120 are imbedded in a castable high temperature refractory material. These tubes 120 can be approximately ½-inch diameter with a ¼-inch gap between, and the layer of tubes and the castable material could be in the range of ¾-inch thick. Alternatively conventional membrane wall construction as employed in the power utility industry may be used. Then, a layer of approximately two to three inches of high grade magnesium oxide brick indicated generally at 121 is provided for an inner refractory liner. A "skull" of iron from the hot metal that would solidify on the brick is shown at 122 to illustrate that a skull lining on the magnesium oxide brick in the layer 121 would be formed. The hot metal would be indicated at 124. Ambient air would be on the outside of the wall 115, and the hot metal then would be on the interior.

Yet another form of construction of the air cooled walls would be to employ castable refractory walls into which a plurality of air channels are cast.

Figure 9:
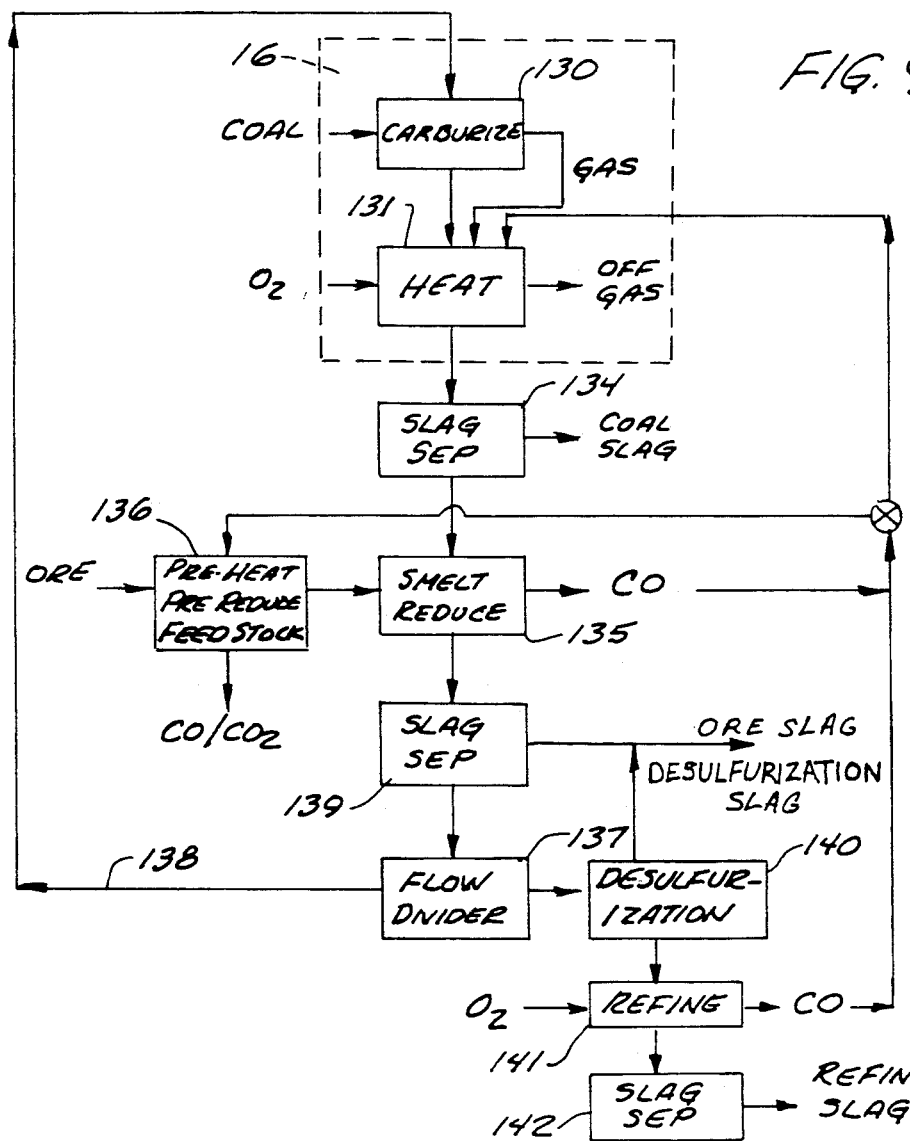
FIG. 9 is a flow chart illustrating the process of the present invention and the various functions that are separated with the device.

A schematic diagram of the process is illustrated in FIG. 9, and the combustion-carburizing chamber 16 is illustrated in dotted lines. The metal product is carburized in this chamber, as indicated by the block 130, by the injection of coal and, through the injection of air and/or oxygen, heat is generated as shown by the block 131. The main use of this oxygen is for combustion of the gases generated in the metal from the injected coal. Depending on overall heat and mass balance objectives, oxygen may also be injected into the melt and generate heat by oxidation of carbon in the melt, and/or the carbon monoxide generated in the outer channels can be returned and combusted in the inner carburization-combustion chamber. Slag separation occurs, as shown, in the settling chamber, as indicated by the block 134, at the coal slag outflow control weir 40 where coal slag is discharged. Molten metal flows into the smelting reducing channel chamber represented by the block 135. Feed stock from a feed source is provided as ore, and can be preheated or prereduced as represented by the block 136, using gases from the process, and this will tend to discharge an off gas comprising a mixture of carbon monoxide and carbon dioxide. The heated feed stock will then be fed into the smelt-reducing channel for smelting as represented by the block 135. Slag separation 139 is provided at a suitable weir gate and ore slag is then discharged. The molten metal material then goes into what is essentially a flow divider 137 which comprises the under feed channel at the end of the smelting channel, and the discharge port or weir to the desulfurization-refining channel. The majority of the material represented at a line 138 returns to the carburizing process in the chamber 16, by being fed into the riser or upflow channel 14 for further processing.

One part of product is sent to the desulfurizing channel indicated at 140 where desulfurizing agents are injected and slag is removed by joining with the ore slag. The metal continues to the refining channel represented at 141 where carbon monoxide is removed from the plenum. The CO is joined with the carbon monoxide from the smelting channel. Slag separation of the refining slag occurs at an underflow/overflow weir represented at 142, and processed steel is then discharged for use or further refining. Refining slag, of course, is discharged separately as well.

The carbon monoxide from both the smelting reduction process and the refining process can be combined and the enthalpy and chemical energy utilized in an optimal fashion to suit the needs of the particular application. Such uses include: preheating the solid and gaseous inputs, pre-reducing raw materials; heating in the combustion chamber so that the mass of metal in the molten pool can be maintained at the desired temperature; or any desired external use.

Lances can be introduced in each of the four sides of the pyramid walls 15 easily along the side walls. Because the fixed reactor does not have to tilt for discharge of product or refined steel, air cooling of the walls is more easily done, and other suitable cooling arrangements can be made.

The dimensions of the smelting channel can be selected to give a reaction time after feed material has been introduced in the smelting channel that is satisfactory for completing as much of the reaction as desired. The heating can be set so that adequate heat is added for reactions that the steel maker wants to use before the molten material exits the inner or first carburizing-combustion chamber. The inclined wall 26B also contributes to the ease of access for lances.

The molten metal in the smelting channel has both thermal inertia and chemical inertia for insuring adequate smelt/reduction processing. A total amount of about 300 tons of molten metal is needed with the present reactor for a continuous process of adequate size, for example, 65 tons per hour, while other proposed processes need up to five times that much for similar production.

Formation of slag in the inner chamber can be controlled independently of slag formation in the smelting channel, so that the reactions can be separately controlled. Because the off gases from the combustion chamber and from the smelting channel, which is substantially pure carbon monoxide, are separately collected and completely isolated, the use of these products in preheating and other functions are easily controlled as well.

In FIG. 10, a simplified schematic top plan view of the present reactor is shown to illustrate the various activity zones, and the ability to control the process by altering the zones of operation. The outer annular settling, smelting-reduction and refining channels can be divided into separate zones to permit different reaction sequences and the production of different hot metal product chemistries.

FIG. 10 shows a reactor with five zones in the outer annular channel-chamber, zone $Z_1$ (settling) with angle $\Theta_1$, zone $Z_2$ (feed) with angle $\Theta_2$, zone $Z_3$ (smelting) with angle $\Theta_3$, zone $Z_4$ (desulfurizing) with angle $\Theta_4$ and zone $Z_5$ (refining) with angle $\Theta_5$. Product can be taken from different zones according to requirements, and four possible products, $P_1$, $P_2$, $P_3$ and $P_4$ and four possible slags $S_1$, $S_2$, $S_3$ and $S_4$ are shown in FIG. 10. $P_1$ is a high carbon pig iron, $P_2$ is an unrefined intermediate carbon product, $P_3$ is an intermediate carbon desulfurized product, and $P_4$ is a refined steel. $S_1$ is the coal slag, $S_2$ is the feed ore slag, $S_3$ is the desulfurizing slag and $S_4$ is the refining slag.

The residence time of the metal, and hence treatment time, in each of the zones, can be set to achieve the required level of completion of reaction choice of the angles $\Theta_1$, $\Theta_2$, $\Theta_3$, $\Theta_4$ and $\Theta_5$, and also the cross sectional area for flow through zones $Z_1$, $Z_2$, $Z_3$, $Z_4$ and $Z_5$. The down flow passageway or channel for recycling metal flow to the bottom of the combustion chamber 16 is located at the end of zone $Z_3$ (the smelting channel-chamber) and the bulk of the metal flow therefore passes through zones $Z_1$, $Z_2$ and $Z_3$. Final products $P_1$, $P_2$, $P_3$ or $P_4$ are a small proportion of the total metal flow and the bulk of the metal flow returns to the combustion chamber 16 at the end of zone $Z_3$. The volumetric flow through zones $Z_1$, $Z_2$ and $Z_3$ is consequently much greater than the flow through zones $Z_4$ and $Z_5$. The cross sectional area for flow in zones $Z_1$, $Z_2$ and $Z_3$ is therefore generally greater than the cross sectional area for flow in zones $Z_4$ and $Z_5$ (see FIG. 1).

Zone $Z_1$ can be considered a zone for separation of slag from fully carburized metal. If product $P_1$ is taken from this zone, it will have a high carbon content and be similar to a blast furnace pig iron. It essentially will be the metal component of the product which flows from the combustion chamber through the opening 29 to the settling channel forming Zone 1.

Zone $Z_2$ is the feed zone and provides the required space for surface feeding and/or subsurface injection. If surface feeding only is employed, at least two subsequent dividing walls forming overflow weirs are preferred to permit injection mixing to insure complete smelting/reduction. The injection gas can be inert for mixing without heating, or oxygen if additional heat input is required.

Zone $Z_3$ is the smelting zone and for the surface feeding case may comprise over half of the length of the annular smelting channel-chamber in order to provide a sufficient residence time for all the feed melting/smelting reactions to reach completion. If product $P_2$ is taken at the end of zone $Z_3$ it will have an intermediate carbon content and can be termed a "semi-steel." If submerged injection of fine feed material is employed then the reaction rates are generally much faster than for surface feeding and zone $Z_3$ can be minimized.

Zone $Z_4$ is the desulfurizing zone where, if required, desulfurizing reactions may be carried out employing conventional desulfurizing practice. Product $P_3$ is a steel product low in sulfur but with intermediate carbon content.

Zone $Z_5$ is the steel refining zone where, if required, conventional steel making reactions are carried out by the use of oxygen and additional reagents. The final product $P_4$ is a steel product which can be tailored to meet a range of conventional steel product specifications.

In any of the zones, temperature control can be achieved by the injection of oxygen for temperature increase or carbon dioxide for temperature decrease. In both of these cases, the final gas product is carbon monoxide.

The overall structure thus provides a very compact, efficient smelting reactor, which also provides a wide range of adaptability for individual steel making processes, by separating out the primary reactions and isolating them so the molten metal occurring in each of these reactions can be separately treated.

It is clear that the present reactor may also be used as an efficient scrap melter if scrap in a suitable form is added in the feed zone or zones as a substitute or partial substitute for other feed materials.

Under some operating conditions slag separation may occur in the carburization/combustion chamber, in which case a vertical discharge slot having a height selected as needed, in addition to port 29, may be provided in wall 12 to permit slag discharge into the settling zone of the channel.

The cooling tubes in the wall shown in FIG. 8 have an air supply connected to the tubes for circulating cooling air, which cools the brick 121 so the metal skull 122 is formed. The brick layers 121 can be made of a suitable material which withstands the temperatures involved in the reactor.

Although the present invention has been described with reference to preferred embodiments, workers skilled in the art will recognize that changes may be made in form and detail without departing from the spirit and scope of the invention.

What is claimed is:

1. A totally integrated metallurgical reactor for manufacturing metal from raw materials comprising an enclosed structure having a central chamber for containing a first molten product, said chamber having an exterior periphery, said chamber being enclosed and having a heating zone;

a channel having walls defining a flow path positioned around at least portions of the exterior periphery of said central chamber and comprising a plurality of interconnected segments, each forming a processing zone;

means for introducing raw materials to the central chamber to permit establishing a first molten product;

means forming a flow opening between the central chamber and the channel for permitting a first molten product to flow into the channel;

means positioned along the channel at desired locations for removing undesirable products;

means for adding raw feed material in at least one zone of the channel to first molten product therein, the channel having sufficient length for providing at least two zones for treatment for first molten product;

passageway means connecting the flow path defined by the channel with the central chamber and opening to the chamber below a lower level of the flow opening in the central chamber for permitting recycling of a substantial portion of a first molten product in said flow path to said central chamber; and means for removing a finished product from the flow path.

2. The integrated reactor as specified in claim 1, wherein said means for removing undesirable products includes means for removing slag from the upper portions of the first molten product at a selected zone location of the channel.

3. The integrated reactor of claim 2, wherein said means for adding raw materials in said one zone of the channel comprises injection means for raw material.

4. The integrated reactor as specified in claim 1, wherein the zones in the channel are formed by a plurality of weir dividers for establishing separate compartments along the channel.

5. The integrated reactor as specified in claim 1, wherein said central chamber has a lower section of smaller dimension than upper portions of the chamber in which combustible materials are injected to adjust the chemical composition of the first molten product, wherein the means connecting for permitting recycling opens to the lower section of the central chamber.

6. The integrated reactor of claim 5, wherein the lower section is formed by walls that incline outwardly in an upward direction, the means for introducing raw material to the central chamber comprising at least one injection lance inclined outwardly from the central axis from the lower section and extending through a top portion of the enclosed structure.

7. The integrated reactor as specified in claim 1, wherein the channel has an enclosed upper portion which is part of the enclosed structure, the channel being divided into at least two zones that are divided by wall means that also isolates space in the enclosed upper portion to prevent intermixing of gases between the two zones.

8. The integrated reactor of claim 7 wherein the two isolated zones comprise a first zone and a second zone, the first zone of the channel being connected to the central chamber by the means forming a flow opening and the space above the enclosed upper portion in the first zone being connected to the central chamber at a level above the flow opening.

9. The integrated reactor of claim 8, wherein the first zone of the channel provides a molten product settling chamber, one of the means for removing undesirable products comprising a gas seal weir that establishes a level for liquid flow out of the channel without permitting gases in the upper portion of the first zone to escape.

10. The integrated reactor of claim 9 wherein the flow path from the first zone to the second zone of the channel comprises port means in the wall means between the first and second zones, said port means being below the established level of the gas seal weir.

11. The integrated reactor of claim 10 wherein the means for adding raw feed material in one zone of the channel includes means located in the second zone.

12. The integrated reactor of claim 11 wherein the second zone comprises a smelting reaction zone and is divided into at least two flow path compartments, each of which compartments is connected to means for feeding raw feed material into such compartment.

13. The integrated reactor of claim 11 and means dividing the second zone from a third zone of the channel, said third zone comprising a zone for receiving molten product for refining and finishing into a steel product.

14. The integrated reactor of claim 13 wherein each of the second and third zones has a portion of the means for removing undesirable products therein comprising slag removal weir means in the respective zones.

15. An integrated metallurgical reactor for manufacturing metal comprising an enclosed reactor housing having an internal chamber having an outer periphery, said internal chamber being made for containing a molten product up to a desired level; and being enclosed to form a plenum above the desired level, comprising:

walls defining a molten product flow path channel from an inlet to an outlet adjacent the internal chamber and extending along the outer periphery including a molten product flow portion and a plenum portion;

a first zone defined in the channel including means for receiving a molten product from the internal chamber above the desired level;

first slag removal weir means establishing a second level in the first zone;

a second zone in the channel separated from the first zone with a flow path opening between the first and second zones for permitting flows into the second zone at a third level below the second level established by the first weir means;

means in at least one of the zones for adding feed materials into the channel;

at least one second slag weir means in the channel establishing a third level in the flow path subsequent to the means for adding feed materials; and passageway means adjacent the outlet of the channel and extending between the channel and a lower portion of the interior chamber, the passageway means opening below the third level for recycling a substantial portion of any molten product from said channel flow path to said interior chamber.

16. The integrated reactor as specified in claim 15, including third weir means for removing slag from the upper portion of the molten product at an outlet end of the channel.

17. The integrated reactor as specified in claim 15, wherein said first zone comprises a settling chamber.

18. The integrated reactor as specified in claim 17 wherein there is a plurality for controlling movement of molten product and establishing separated volumes in the second zone, said means for adding feed material comprising means for feeding such material into one of the separated volumes.

19. The integrated reactor as specified in claim 15 wherein said first and second zones have wall means defining first and second plenums above the molten products in the channel, the second plenum being isolated from the first plenum to permit separation of gases in the respective zones.

20. The integrated reactor of claim 15, wherein the channel has a tapered outer wall that tapers outwardly from a central axis of the interior chamber in direction upwardly to permit a lance for adding materials to rest on an outer wall and extend upwardly at an angle away from the central axis of the interior chamber.

21. An integrated reactor for containing molten product, slag and gases comprising a housing; a combustion chamber defined in the center portions of said housing, said combustion chamber being an enclosed chamber except for desired inlets and outlets and having an exterior periphery;
   a channel formed on said housing along the exterior periphery of said combustion chamber, and comprising a hot molten product flow channel;
   said combustion chamber comprising a reaction chamber for holding molten product and having means for introducing feed materials and gases for combustion of off gas and carburizing of a molten product;
   an orifice defined through a combustion chamber wall leading from the combustion chamber to said channel below a first level;
   said channel having a first slag removal zone;
   a first weir at the first zone of the channel establishing a second level for removing slag;
   said channel having a second zone connected through a second orifice to the first zone, the second orifice being below the reference level;
   said second zone including second feed means for introducing feed material into the channel;
   first and second overflow weir walls in said second zone of the channel spaced along the exterior periphery of said combustion chamber and establishing separate levels to regulate volumes in the channel, into which feed material may be introduced;
   an outflow weir formed on said channel to establish a third level for removal of slag in said second zone;
   a third orifice established below the third level of said outflow weir, said third orifice connecting to a passageway to the interior of said combustion chamber adjacent a bottom portion of said combustion chamber.

22. The integrated reactor as specified in claim 21 and a third steel refining zone of said channel comprising a series of compartments for refining a molten product into a steel.

23. The integrated reactor as specified in claim 23 wherein said steel refining zone comprises a channel having a plurality of overflow weir walls in series therein forming a plurality of individual sections of said steel refining zone, and slag removal weir opening from said steel refining zone.

24. The integrated reactor as specified in claim 23 and an underflow weir for removing steel from said steel refining zone at an end thereof, said first, second, and third zones of said channel substantially circumscribing the combustion chamber.

25. The integrated reactor as specified in claim 21 wherein the chamber and the channel have walls with surfaces for contact with molten materials, the walls for contact with molten materials having a layered construction including a layer of brick having said surfaces for contact with molten materials, a backing for the layer of bricks comprising a layer of refractory material having a plurality of cooling air passages therein, and support and insulation wall means to an exterior of the last mentioned layer.

* * * * *

UNITED STATES PATENT AND TRADEMARK OFFICE
CERTIFICATE OF CORRECTION

PATENT NO. : 5,060,913
DATED : October 29, 1991
INVENTOR(S) : Kenneth J. Reid

It is certified that error appears in the above-identified patent and that said Letters Patent is hereby corrected as shown below:

On the title page:

In the References Cited Section, under OTHER PUBLICATIONS, insert the following:

"Coal-Based Ironmaking Via Melt Circulation", by N. A. Warner, *Metallurgical Processes for the Year 2000 and Beyond, The Minerals*, Metals and Materials Society, 1988, pp. 699-719.

Col. 22, line 62, following "plurality", insert --of weir dividers in said second zone for the channel"--

Col. 24, line 15, delete "claim 23" and insert --claim 22--.

Signed and Sealed this

Ninth Day of March, 1993

Attest:

STEPHEN G. KUNIN

*Attesting Officer*      *Acting Commissioner of Patents and Trademarks*